(12) United States Patent
Weare (10) Patent No.: US 7,013,238 B1
(45) Date of Patent: Mar. 14, 2006

(54) SYSTEM FOR DELIVERING RECOMMENDATIONS

(75) Inventor: Christopher B. Weare, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 70 days.

(21) Appl. No.: 10/621,268

(22) Filed: Jul. 15, 2003

Related U.S. Application Data (60) Provisional application No. 60/449,885, filed on Feb. 24, 2003.

(51) Int. Cl.
*G06F 3/02* (2006.01)

(52) U.S. Cl. ............ 702/182; 702/183; 702/186; 702/188

(58) Field of Classification Search ........ 702/179, 702/181–183, 186, 188, 189, 194; 235/385; 705/7; 709/203
See application file for complete search history.

(56) References Cited

U.S. PATENT DOCUMENTS

| | | | | |
|---|---|---|---|---|
| 5,918,223 | A | | 6/1999 | Blum et al. ............ 707/1 |
| 6,029,195 | A | * | 2/2000 | Herz ............ 725/116 |
| 6,421,612 | B1 | * | 7/2002 | Agrafiotis et al. ........ 702/19 |
| 6,758,397 | B1 | * | 7/2004 | Catan ............ 235/385 |
| 2003/0066068 | A1 | * | 4/2003 | Gutta et al. ............ 725/9 |
| 2004/0210661 | A1 | * | 10/2004 | Thompson ............ 709/228 |

OTHER PUBLICATIONS

Chen, H.-C., and Arbee L.P. Chen, "A Music Recommendation System Based on Music Data Grouping and User Interests," *Proceedings of the 2001 ACM CIKM 10th International Conference on Information and Knowledge Management*, Atlanta, Ga., Nov. 5-10, 2001, pp. 231-238.

Dunne, J., et al., "mpME!: Music Recommendation and Exploration," *Proceedings of the 2002 International Conference on Intelligent User Interfaces (IUI 02)*, San Francisco, Calif., Jan. 13-16, 2002, p. 235.

* cited by examiner

*Primary Examiner*—Marc S. Hoff
*Assistant Examiner*—Felix Suarez
(74) *Attorney, Agent, or Firm*—Christensen O'Connor Johnson Kindness PLLC (57) ABSTRACT

A system for generating recommendations which automatically optimizes over time without human intervention is disclosed. While known recommendation systems tended to be either attribute based or collaborative filtering based, the present system adjusts its internal parameters in response to the measured performance of the recommendations as determined by user behavior. In one embodiment, the user provides feedback in the form of ratings for the recommendations. This feedback is processed and then utilized to adjust the internal parameters of the system. Over time, the system settles on optimal parameter values.

32 Claims, 7 Drawing Sheets

SYSTEM FOR DELIVERING RECOMMENDATIONS

CROSS-REFERENCE(S) TO RELATED APPLICATION(S)

This application claims the benefit of U.S. Provisional Application No. 60/449,885, filed Feb. 24, 2003, under the provisions of 35 U.S.C. § 119.

FIELD OF THE INVENTION

The embodiment of the present invention relates to recommendation systems, and more particularly, a recommendation system that adjusts its internal parameters in response to the measured performance of the recommendations as determined by user behavior.

BACKGROUND OF THE INVENTION

The task of a recommendation system is to recommend items or services to a user. In one example, a recommendation engine provided by a Web-based music vendor may recommend certain songs to customers. Two classes of recommendation systems that can be used for such purposes are attribute based recommendation systems and collaborative filtering based recommendation systems. An attribute based recommendation system uses intrinsic properties, or attributes, of items to supply recommendations. For example, recommendations for songs by a particular artist might be given to a user who has indicated they like other songs by that artist. The task for the recommendation system is to select songs that are "related" to the songs the user likes, and which the user has not already encountered. What is meant by related depends on the approach being used to generate the recommendation, which in an attribute based recommendation system typically depends on what attributes of the items to be recommended are deemed important and how distance is determined between various values of those attributes. An example of a collaborate filtering based recommendation system is when a merchant or vendor presents suggestions of items based on prior purchases of others. For example, a merchant may have the system display information stating "People who bought this music also bought . . . " followed by a list of recommended music.

Recommendation systems are frequently utilized by online merchants such as AMAZON.COM®, BARNESANDNOBLE.COM®, CDNOW.COM®, etc. A prospective consumer can use a computer system equipped with a standard Web browser to contact an online merchant, browse an online catalog of pre-recorded music, select a song or collection of songs ("album"), and purchase the song or album for shipment direct to the consumer. In this context, online merchants and others desire to assist the consumer in making a purchase selection and desire to recommend possible selections for purchase.

A variety of recommendation systems are currently available. In the approach of AMAZON.COM®, a collaborative based recommendation system is utilized. More specifically, when a client requests detailed information about a particular album or song, the system displays information stating, "People who bought this album also bought . . ." followed by a list of other albums or songs. The list of other albums or songs is derived from actual purchase experience of the system.

However, the use of this type of collaborative filtering approach by itself has a significant disadvantage, namely that the suggested albums or songs are based on extrinsic similarity as indicated by purchase decisions of others, rather than based upon objective similarity of intrinsic attributes of a requested album or song and the suggested albums or songs. A decision by another consumer to purchase two albums at the same time does not indicate that the two albums are objectively similar or even that the consumer liked both. For example, the consumer might have bought one for the consumer and the second for a third party having greatly differing subjective taste than the consumer.

Another disadvantage of collaborative filtering is that output data is normally available only for complete albums and not for individual songs. Thus, a first album that the consumer likes may be broadly similar to second album, but the second album may contain individual songs that are strikingly dissimilar from the first album, and the consumer has no way to detect or act on such dissimilarity.

Still another disadvantage of collaborative filtering is that it requires a large mass of historical data in order to provide useful search results. The search results indicating what others bought are only useful after a large number of transactions, so that meaningful patterns and meaningful similarity emerge. Moreover, early transactions tend to over-influence later buyers, and popular titles tend to self-perpetuate.

In yet another approach, digital signal processing (DSP) analysis can be used to try to match characteristics from song to song, which can then be used for recommendations. U.S. Pat. No. 5,918,223, assigned to Muscle Fish, a corporation of Berkeley, Calif. (hereinafter the Muscle Fish Patent), describes a DSP analysis technique. The Muscle Fish Patent describes a system having two basic components, typically implemented as software running on a digital computer. The two components are the analysis of sounds (digital audio data), and the retrieval of these sounds based upon statistical or frame-by-frame comparisons of the analysis results. In that system, the process first measures a variety of acoustical features of each sound file and the choice of which acoustical features to measure is critical to the success of the process. Loudness, bass, pitch, brightness, bandwidth, and Mel-frequency cepstral coefficients (MFCCs) at periodic intervals (referred to as "frames") over the length of the sound file are measured. The per-frame values are optionally stored, for applications that require that level of detail. Next, the per-frame first derivative of each of these features is computed. Specific statistical measurements of each of these features are computed to describe their variation over time. The specific statistical measurements that are computed are the mean and standard deviation. The first derivatives are also included. This set of statistical measurements is represented as an N-vector (a vector with N elements), referred to as the rhythm feature vector for music.

Once the feature vector of the sound file has been stored in a database with a corresponding link to the original data file, the user can query the database in order to access the corresponding sound files. The database system must be able to measure the distance in N-space between two N-vectors.

The sound file database can be searched by four specific methods, enumerated below. The result of these searches is a list of sound files rank-ordered by distance from the specified N-vector, which corresponds to sound files that are most similar to the specified N-vector or average N-vector of a user grouping of songs.

1. Simile: The search is for sounds that are similar to an example sound file, or a list of example sound files.
2. Acoustical/perceptual features: The search is for sounds in terms of commonly understood physical characteristics, such as brightness, pitch and loudness.
3. Subjective features: The search is for sounds using individually defined classes. One example would be to be searching for a sound that is both "shimmering" and "rough," where the classes "shimmering" and "rough" have been previously defined by a grouping. Classes of sounds can be created (e.g., "bird sounds," "rock music," etc.) by specifying a set of sound files that belong to this class. The average N-vector of these sound files will represent this sound class in N-space for purposes of searching. However, this requires ex post facto grouping of songs that are thought to be similar.
4. Onomatopoeia: Involves producing a sound similar in some quality to the sound that is being searched for. One example is to produce a buzzing sound into a microphone in order to find sounds like bees or electrical hum.

While DSP analysis may be effective for some groups or classes of songs, it is ineffective for others, and there has so far been no technique for determining what makes the technique effective for some music and not others. Specifically, such acoustical analysis as has been implemented thus far suffers defects because 1) the effectiveness of the analysis is being questioned regarding the accuracy of the results, thus diminishing the perceived quality by the user and 2) recommendations are only generally made by current systems if the user manually types in a desired artist or song title, or group of songs from that specific Web site. Accordingly, DSP analysis, by itself, is unreliable and thus insufficient for widespread commercial or other use. Another problem with the DSP analysis is that it ignores the observed fact that oftentimes, sounds with similar attributes as calculated by a digital signal processing algorithm will be perceived as sounding very different. This is because, at present, no previously available digital signal processing approach can match the ability of the human brain for extracting salient information from a stream of data. As a result, all previous attempts at signal classification using digital signal processing techniques miss important aspects of a signal that the brain uses for determining similarity, and recommendations made based on such classifications are thus found lacking.

The embodiment of the present invention is related to providing a system that overcomes the foregoing and other disadvantages. More specifically, the embodiment of the present invention is related to a recommendation system that adjusts its internal parameters in response to the measured performance of the recommendations as determined by user behavior.

SUMMARY OF THE INVENTION

A system for generating recommendations which automatically optimizes over time without human intervention is disclosed. While known recommendation systems tended to be either attribute based or collaborative filtering based, the present system adjusts its internal parameters in response to the measured performance of the recommendations as determined by user behavior. In one embodiment, the user provides feedback in the form of ratings for the recommendations. This feedback is processed and then utilized to adjust the internal parameters of the system. Over time, the system settles on optimal parameter values.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The embodiment of the present invention relates to a system for generating recommendations, which automatically optimizes its parameters over time without human intervention. While known recommendation engines used intrinsic properties of items to display recommendations, the present engine adjusts its internal parameters in response to the measured performance of the recommendations as determined by user behavior. In one embodiment, the user behavior is represented by feedback that the user provides in the form of ratings for the recommendations. On the basis of these ratings, the parameters of the system are adjusted. Over time, after a sufficient number of iterations the system settles toward optimal parameter values.

Figure 1:
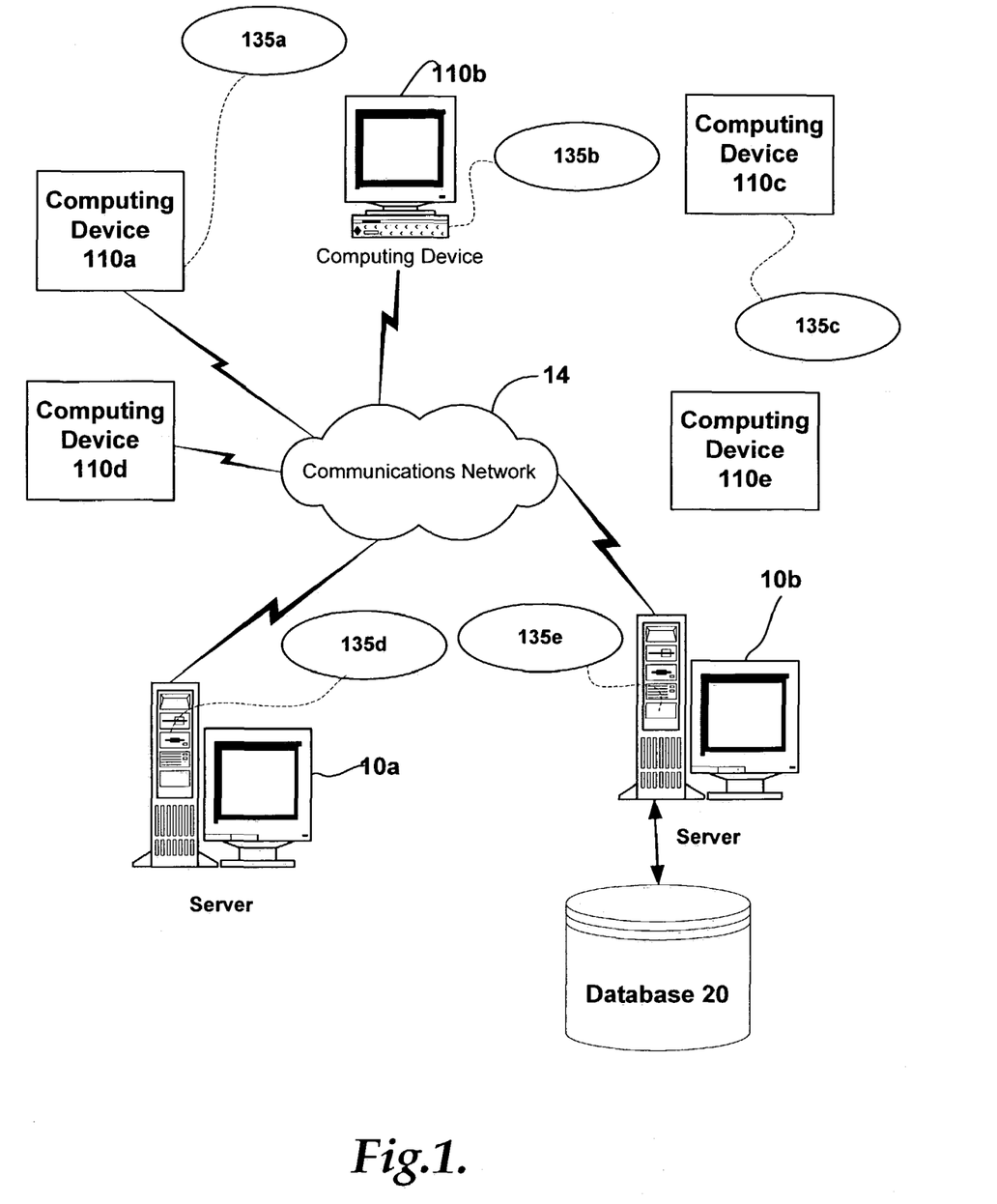
FIG. 1 is a block diagram representing an exemplary network environment in which the embodiment of the present invention may be implemented.

With regard to FIG. 1, one of ordinary skill in the art can appreciate that a computer 110 or other client device can be deployed as part of a computer network. In this regard, the embodiment of the present invention pertains to any computer system having any number of memory or storage units, and any number of applications and processes occurring across any number of storage units or volumes. The embodiment of the present invention may apply to an environment with server computers and client computers deployed in a network environment, having remote or local storage. The embodiment of the present invention may also apply to a standalone computing device, having access to appropriate recommendation data and an appropriate recommendation generation engine.

FIG. 1 illustrates an exemplary network environment, with a server in communication with client computers via a network, in which the embodiment of the present invention may be employed. As shown, a number of servers 10a, 10b, etc., are interconnected via a communications network 14, which may be a LAN, WAN, intranet, the Internet, etc., with a number of client or remote computing devices 110a, 1110b, 110c, 1110d, 110e, etc., such as a portable computer, handheld computer, thin client, networked appliance, or other device, such as a VCR, TV, and the like in accordance with the embodiment of the present invention. It is thus contemplated that the embodiment of the present invention may apply to any computing device in connection with which it is desirable to provide recommendation services for different types of items or services such as music, video, news, etc. In a network environment in which the communications network 14 is the Internet, for example, the servers 10 can be Web servers with which the clients 110a, 110b, 110c, 110d, 110e, etc., communicate via any of a number of known protocols such as hypertext transfer protocol (HTTP). Communications may be wired or wireless, or a combination thereof, where appropriate. Client devices 110 may or may not communicate via the communications network 14, and may have independent communications associated therewith. For example, in the case of a TV or VCR, there may or may not be a networked aspect to the control thereof. Each client computer 110 and server computer 10 may be equipped with various application program modules 135 and with connections or access to various types of storage elements or objects, across which files may be stored or to which portion(s) of files may be downloaded or migrated. Any server 10a, 10b, etc. may be responsible for the maintenance and updating of a database 20 in accordance with the embodiment of the present invention, such as a database 20 for storing recommendation information, items or services, and/or software incident thereto. Thus, the embodiment of the present invention can be utilized in a computer network environment having client computers 110a, 110b, etc., for accessing and interacting with a communications network 14 and server computers 10a, 10b, etc., for interacting with client computers 110a, 110b, etc., and the database(s) 20, and any other devices that should become part of the network.

Figure 2:
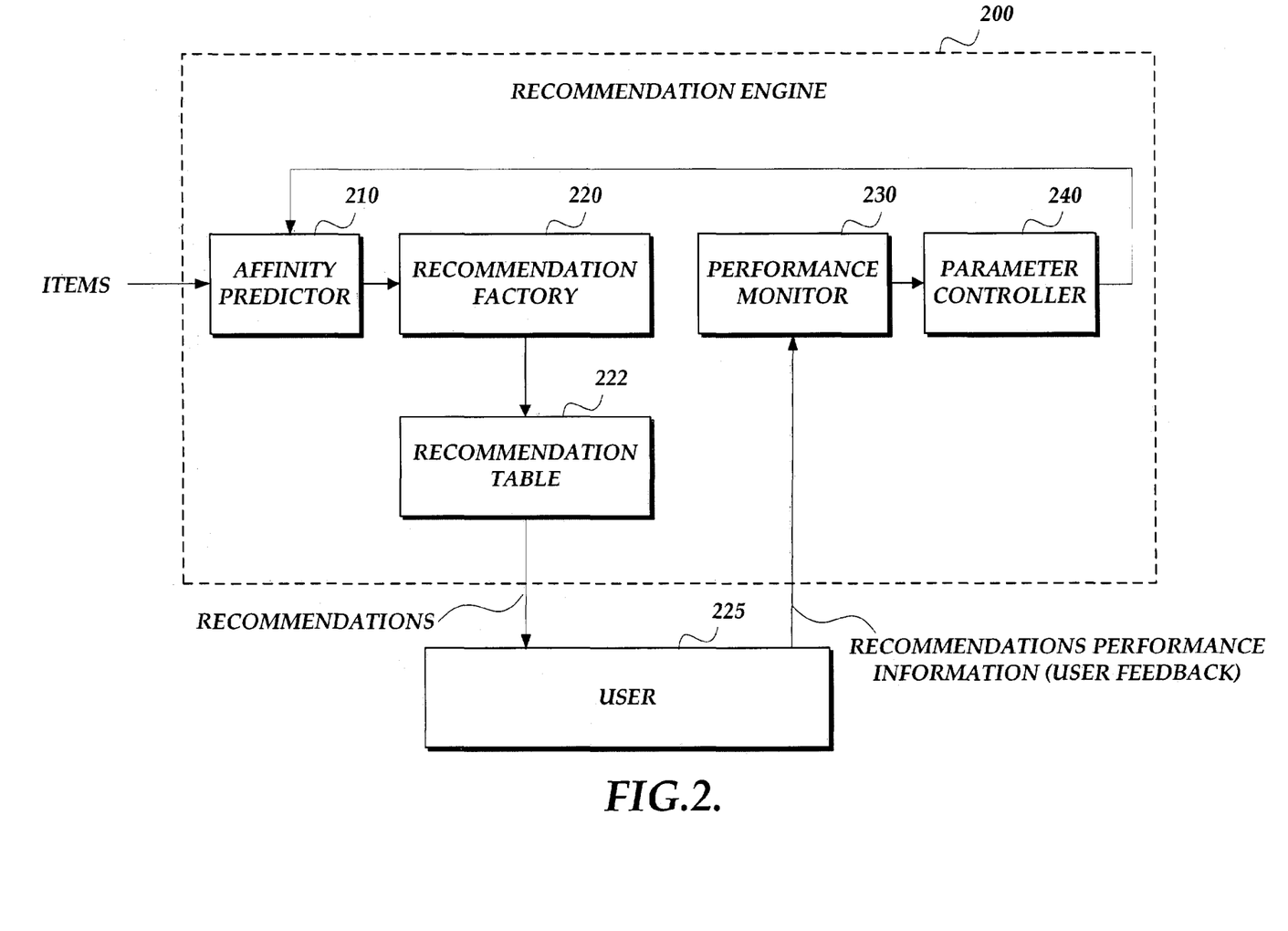
FIG. 2 is a block diagram illustrative of the components of a recommendation engine in accordance with the embodiment of the present invention.

FIG. 2 is a block diagram of a recommendation engine 200 that provides recommendations. The four major components of the recommendation engine 200 are an affinity predictor 210, a recommendation factory 220, a performance monitor 230, and a parameter controller 240. The affinity predictor 210 receives information regarding items (e.g., songs) and determines affinity values that are intended to predict how much a given user will like a given item. The affinity predictor 210 feeds the affinity values to the recommendation factory 220, which uses the affinity values to determine recommendations for certain songs to certain users. The recommendations from the recommendation factory 220 are placed in a recommendation table 222. The recommendations are then loaded out by an external process from the recommendation table and provided to a user 225.

After a certain amount of time, the user 225 provides feedback to the performance monitor 230 regarding what the user thought of the recommendations. In one embodiment, the user feedback may come in the form of the user rating each of the recommendations (e.g., the user liked the first recommendation, didn't like the second one, etc.). The performance monitor processes the user feedback and provides it in a usable form to the parameter controller 240. The parameter controller 240 uses the feedback to adjust the parameters that are used for determining affinity values, and then sends the adjusted parameters to the affinity predictor where they are used at the beginning of the cycle for again determining recommendations.

Figure 3:
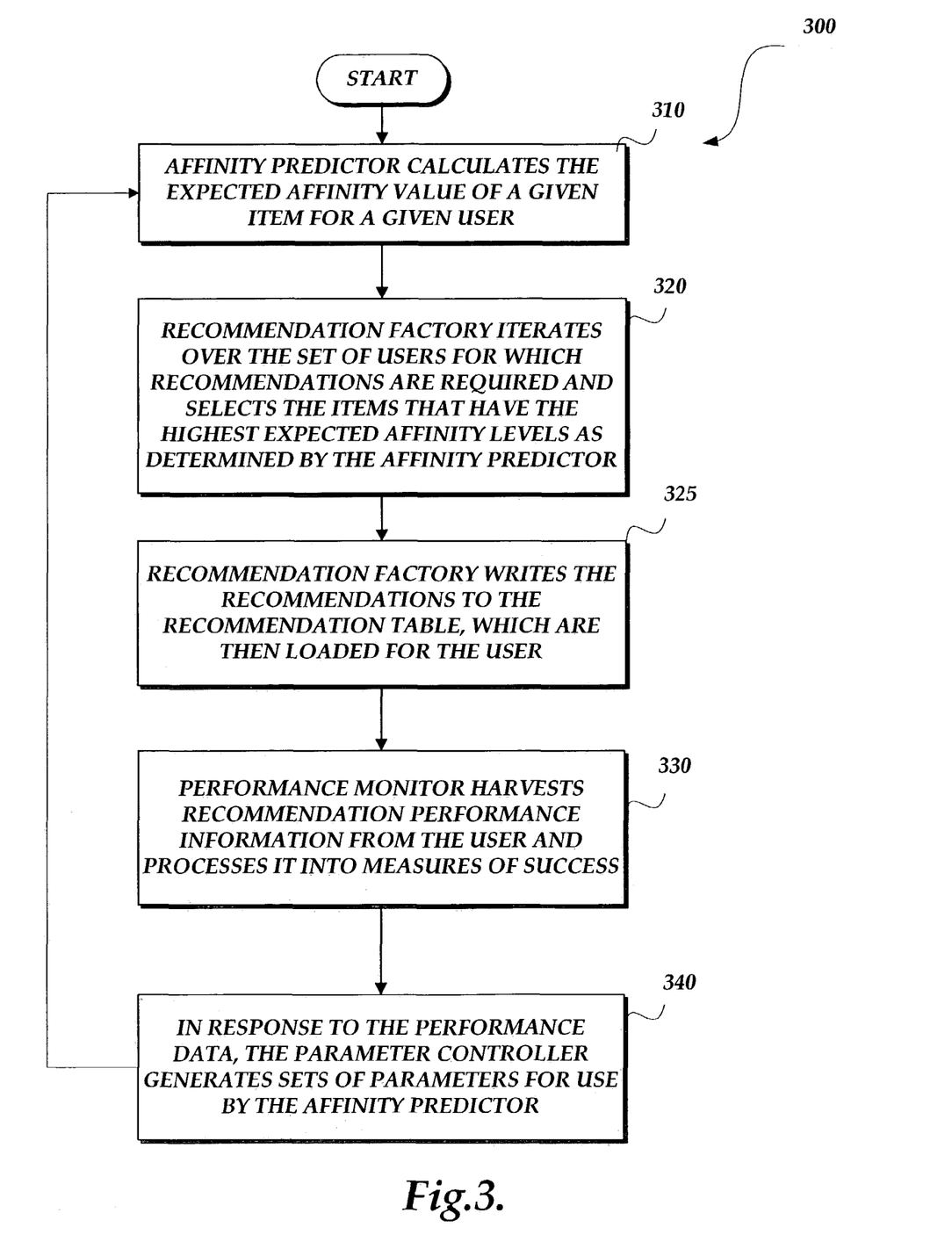
FIG. 3 is a flow diagram illustrative of a general routine for the operation of the recommendation engine of FIG. 2.

FIG. 3 is a flow diagram of a general routine 300 that further illustrates the operation of the components of the recommendation engine 200 of FIG. 2. At a block 310, the affinity predictor calculates the expected affinity value of a given item for a given user. As an example of this process, for a given user A and a group of ten songs, the affinity predictor will provide an affinity value for each of the ten songs which is intended to predict how much the user A will like each song.

A set of parameters selected for user A is utilized by the affinity predictor to determine the affinity values. The parameters in the set indicate how important each attribute of the song is in determining the affinity that user A will have for the song. For instance, one set of parameters might rate the tempo of the song as very important and the artist who performed the song as less important, while a second set of parameters rates the tempo of the song as less important than the artist who performed the song.

The affinity predictor will then repeat the process for a user B using a potentially different set of parameters, providing an affinity value for each of the ten songs which is intended to indicate how much the user B will like each song. The process is repeated for each user in the set of users for which recommendations are required. In one embodiment, the sets of parameters may initially be randomly picked when a recommendation is generated for a user. Also, it should be noted that a given user may be associated with more than one parameter set, and a given parameter set may be associated with more than one user. In other words, if more than one recommendation is generated for a given user, then that user may receive recommendations that utilize more than one parameter set. Also, a single parameter set may be used for generating recommendations for more than one user.

At a block 320, the recommendation factory iterates over the set of users for which recommendations are required and selects the items that have the highest expected affinity levels as determined by the affinity predictor. As an example, for user A, the recommendation factory may pick the top three songs that are expected to be liked by user A, and then for user B, would select the top three songs that are predicted to be liked by user B, and so on. In each case, the "top" songs are selected in accordance with the affinity values that were determined by the affinity predictor.

At a block 325, the recommendation factory writes the recommendations to the recommendation table, which are then loaded for each user. In one embodiment, the process for loading the recommendations for use by the user may be implemented by an external system or program that is outside of the control of the recommendation engine. In one embodiment, the feedback from the users is obtained through a system whereby after the users are given the recommendations, they are given an opportunity to rate the recommendations.

At a block 330, the performance monitor harvests recommendation performance information from all the users and processes it into measures of success. As an example, if the users that received recommendations from a given parameter set indicated that they liked most of the items that were recommended, then the parameter set that produced those recommendations would be rated as having a very high measure of success. Conversely, if user those same users indicated that they did not like many of the recommendations, then the set of parameters which produced those recommendations would be rated as having a very low measure of success.

At a block 340, in response to the performance data, the parameter controller generates sets of parameters for use by the affinity predictor. In other words, based on the feedback from the users, the parameter controller adjusts the parameters of the system, which are utilized by the affinity predictor to predict which items the users will like. Thus, while known recommendation engines used intrinsic properties of items to supply recommendations, the present recommendation engine adjusts its internal parameters in response to the measured performance of the recommendations as determined by user behavior. This process repeats, and over time the recommendation engine settles toward optimal parameter values.

Figure 4:
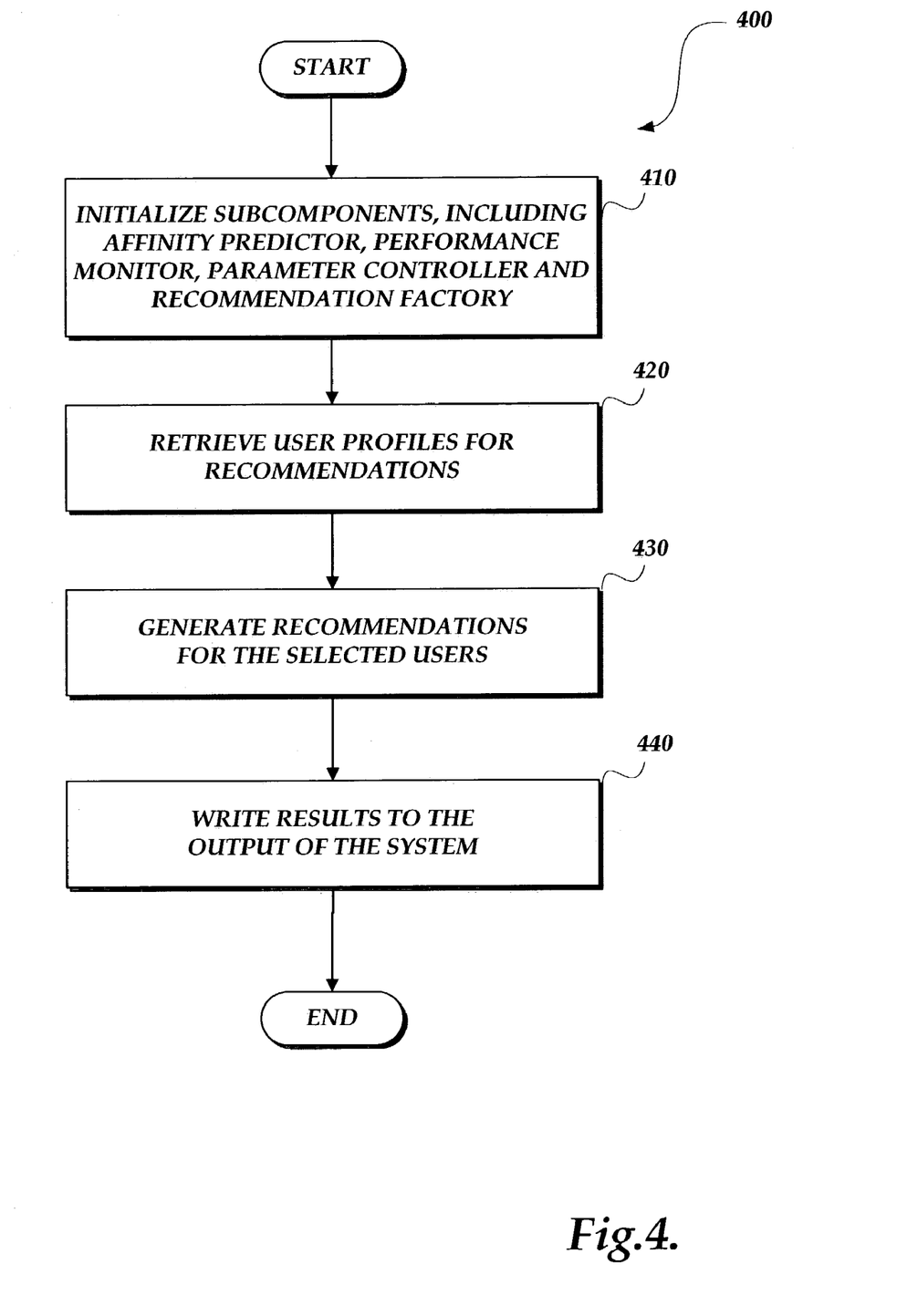
FIG. 4 is a flow diagram illustrative of a general routine for generating recommendations for selected users in an embodiment where general user profiles are utilized.

FIG. 4 is a flow diagram of a general routine 400 for generating recommendations for selected users in an embodiment where general user profiles are utilized. At a block 410, the sub-components are initialized, including the affinity predictor, the performance monitor, the parameter controller, and the recommendation factory. At a block 420, the user profiles are retrieved for determining the recommendations. As will be described in more detail below, the user profiles include the specific sets of parameters that are intended to represent the likes and dislikes of individual users. At a block 430, the recommendations for the selected users are generated based on the users' profiles. At a block 440, the resulting recommendations are written to the output of the system.

Figure 5:
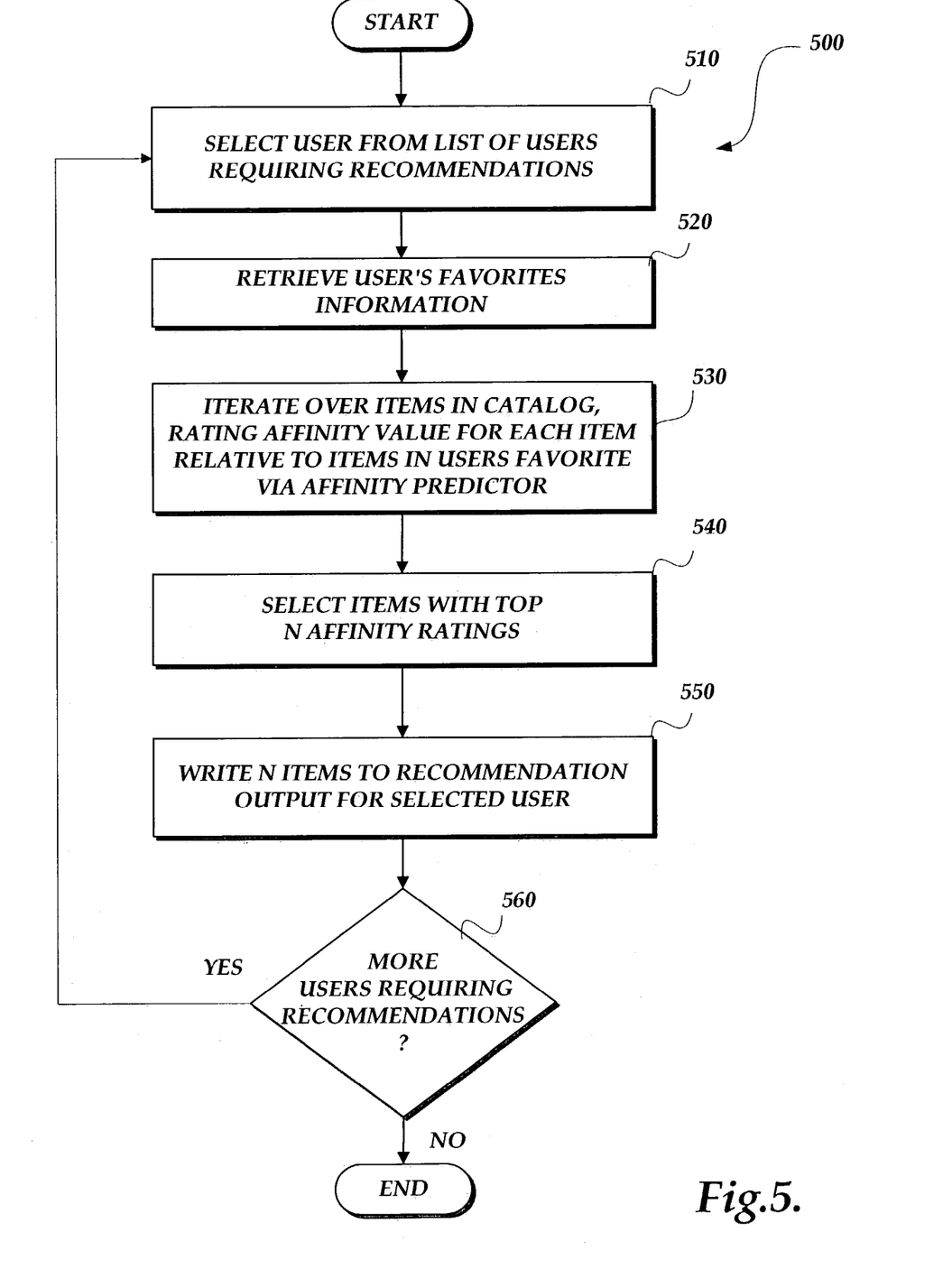
FIG. 5 is a flow diagram illustrative of a routine for generating recommendations in an embodiment where each user is processed sequentially and affinity values are rated for each item.

FIG. 5 is a flow diagram illustrative of a routine 500 for generating recommendations in an embodiment where each user is processed sequentially and affinity values are rated for each item. At a block 510, a particular user is selected from the list of users requiring recommendations. For example, if there are three users A, B, and C that require recommendations, one of the users is initially selected for processing. At a block 520, the user's favorites information is retrieved. In other words, user A may have saved selected items in his favorites list. Favorites can also include items the user has rated very highly. At a block 530, the items in a catalog are iterated over, and an affinity value for each item is rated relative to the items in the user's favorites. The affinity values are rated according to the affinity predictor. In other words, for a given item that the user has saved as being one of the user's favorites, the affinity values are intended to provide an indication of how similar each of the items in the catalog are to the user's favorite item.

At a block 540, the items with the top affinity ratings are selected. The number of items that are selected is determined in accordance with a maximum number n. At a block 550, the items with the top affinity ratings are written to the recommendation output for the selected user. At a decision block 560, a determination is made as to whether more users require recommendations. If more users require recommendations, then the routine returns to block 510 where the next user is selected.

Figure 6:
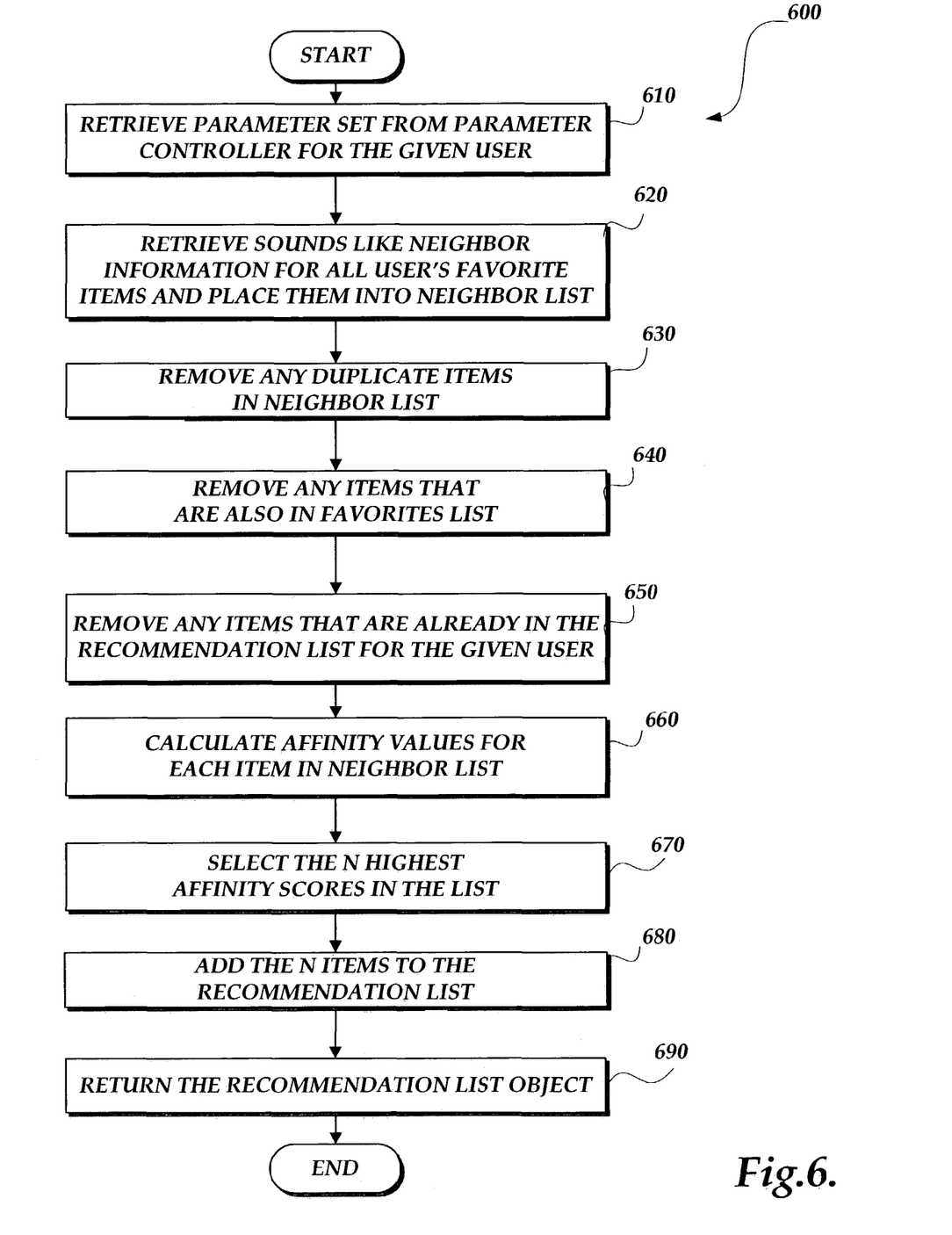
FIG. 6 is a flow diagram illustrative of a routine for generating recommendations in an embodiment where neighbor lists are utilized.

FIG. 6 is a flow diagram illustrative of a routine 600 for generating recommendations in an embodiment where neighbor lists are utilized. At a block 610, the parameter set for a given user is retrieved from the parameter controller. In general, the parameter sets specify the weights used by the affinity predictor in its calculation of affinities. As will be described in more detail below, these weights are variable and driven by a learning process moderated by the parameter controller. At a block 620, the "sounds like" neighbor information is retrieved for all of the user's favorites and placed into the neighbor list. In other words, in an embodiment where the items being recommended are songs, for each song that is saved as a user's favorite, there are a group of songs that are rated as "sounding like" the favorite song. All of these songs that "sound like" the user's favorite songs are grouped together and placed into a neighbor list.

At a block 630, any duplicate items are removed from the neighbor list. By removing duplicate items from the neighbor list, the recommendation engine avoids recommending the same item twice. At a block 640, any items that are also in the favorites list are removed from the neighbor list. By removing any items that are also in the favorites list from the neighbor lists, the recommendation engine avoids recommending items that the user has already saved as a favorite. At a block 650, any items that are already in the recommendation list for a given user are also removed from the neighbor list. By removing items that are already in the recommendation list from the neighbor list, the recommendation engine avoids placing items on the recommendation list that are already there.

At a block 660, affinity values are calculated for each item in the neighborhood list. At a block 670, the n highest affinity scores are selected. These items represent those that are thought to have the highest probability of being liked by the user. At a block 680, the selected items are added to the recommendation list. At a block 690, the recommendation list object is returned.

The calculation of the affinity values at block 660 can be better described through use of the following example that utilizes an EQUATION 1. In this example the items being evaluated for recommendation are songs. Given a favorite song j and a neighbor song k, EQUATION 1 will return the predicted affinity for song k given song j, $A_{jk}$, $$A_{jk} = e^{-\alpha\left(U\left(1-e^{\beta \times ABS(y_j - y_k)}\right) + \omega\delta(a_j - a_k) + \gamma\Sigma_l g_{jl} g_{kl}\right)} \quad \text{(Eq. 1)}$$

where a is the artist id, y is the release date for the song, $g_{.l}$ is the lth autogroove parameter, of which in one embodiment there are six, including two each for the rhythmic, harmonic and melodic components, which represent a perceptual metric for determining the similarity of two music files. Each component includes two values that are used for mapping the component from a perceptual space to a two-dimensional parameter space. In other embodiments, other perceptual metrics may also be used. The weighting coefficients $\alpha, \beta, \omega, \gamma$ define the parameter set and are supplied by the parameter controller. The first parameter, $\alpha$, is the tolerance coefficient, which specifies how quickly the user's affinity for items falls as a function of distance. U(f), the Heaviside step function, returns 1 if f>0, and 0 otherwise. The freshness coefficient is $\beta$, which indicates how sensitive a user is to the "newness" of material. $\delta(.)$ is the Dirac delta function, which returns 1 if its argument is 0 and 0 otherwise. $\omega$ represents the sensitivity to dissimilar artists. $\gamma$ represents the sensitivity to the autogroove parameters. In one embodiment, $\gamma_i$ equals 1.0. By utilizing EQUATION 1, affinity values for songs can thus be calculated.

Figure 7:
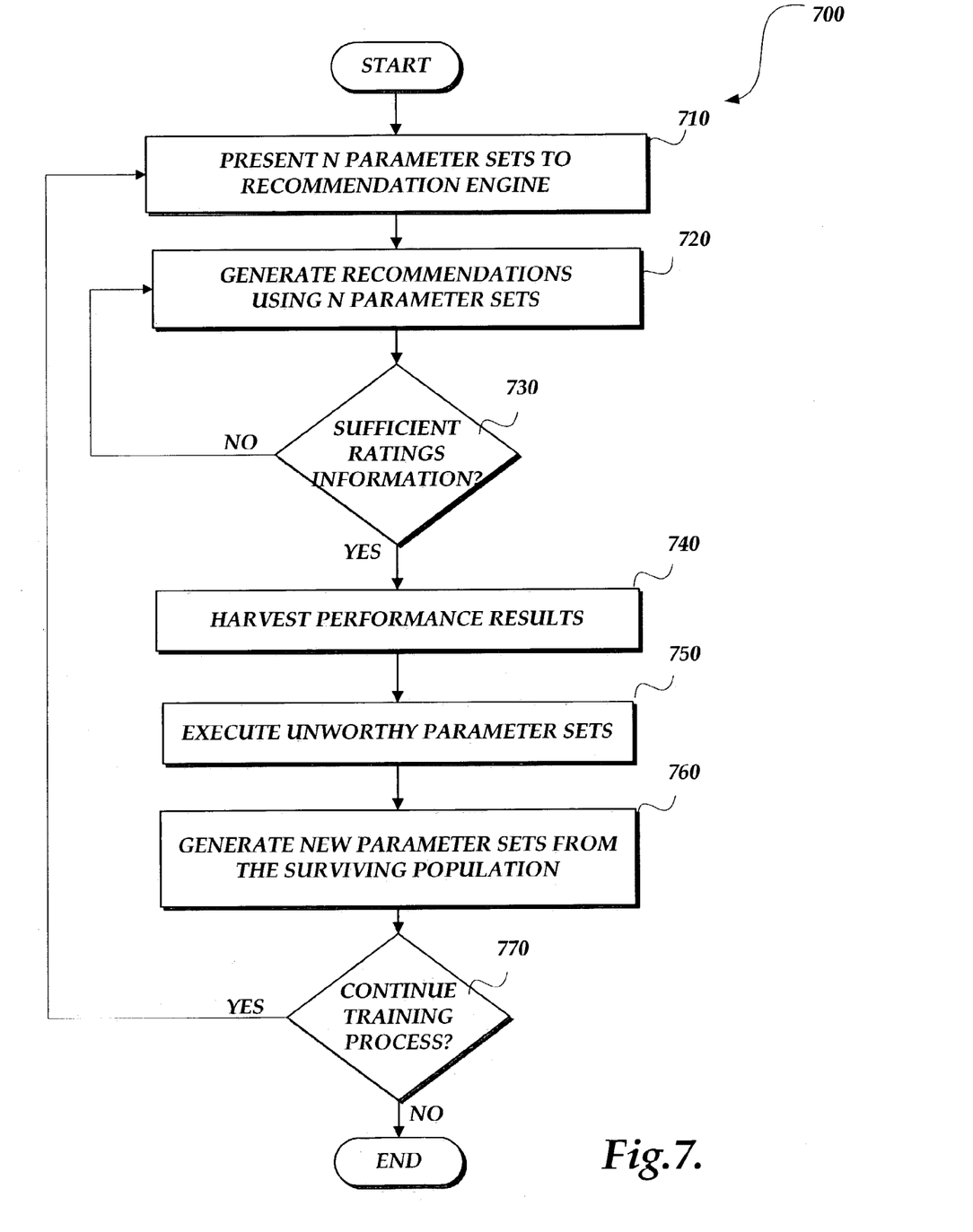
FIG. 7 is a flow diagram illustrative of a routine for generating new parameter sets in an embodiment where ratings information is used to evaluate the performance of the parameters.

FIG. 7 is a flow diagram illustrative of a routine 700 for generating new parameter sets in an embodiment where ratings information is used to evaluate the performance of the parameters. At a block 710, n parameter sets are presented to the recommendation engine. At a block 720, recommendations are generated using the n parameter sets. At a decision block 730, after the recommendations are generated, the users provide feedback in the form of ratings of the recommendations and a determination is made as to whether sufficient ratings information has been received. In one embodiment, a minimum number of ratings must be received in order to meet the requirement for sufficient ratings information. In one embodiment, 500 ratings distributed among all the parameter sets in a given epoch is considered sufficient. If sufficient ratings information has not yet been received, then the routine returns to block 720 where additional recommendations are generated using the n parameter sets. If sufficient ratings information has been received, then the routine continues to a block 740.

At block 740, the performance results are harvested. As will be described in more detail below, once the performance results are harvested, the system uses the performance results to evaluate the parameter sets, and determine which ones are unworthy. At a block 750, the unworthy parameter sets are executed. In one embodiment, the execution of a parameter set does not mean it is eliminated entirely, instead it may simply be assigned a low value, which thus means it has little chance to breed, as will be described in more detail below. As will further be described in more detail below, in one embodiment the odds of a parameter set A being executed is given by $$P_{death}(A)=e^{-\beta f(A)} \qquad (Eq. 2)$$

where $\beta$ is the executioner fitness dependency. At a block 760, the new parameter sets are generated from the surviving population. In other words, in one embodiment, from N given parameter sets, M new parameter sets are generated via a biased mating of the N parameter sets. In one embodiment, the probability of two parameter sets, A and B, mating with each other P(A,B), is given by $$P_{mate}(A,B)=e^{-\alpha(2*MaxFitness-(f(A)+f(B)))} \qquad (Eq. 3)$$

where $\alpha$ is the systems sensitivity to fitness, MaxFitness is the maximum fitness value in the set of N parameter sets, and f(.) returns the fitness of its argument. At a decision block 770, a determination is made as to whether the training process should continue. If the training process is to continue, then the routine returns to block 710.

With regard to FIG. 7, it can generally be stated that blocks 750 and 760, which in one embodiment are implemented in the parameter controller, are an important part of the process for optimizing the performance of the recommendation engine. In one embodiment, the optimization is obtained via a genetic algorithm. To provide a better understanding of blocks 750 and 760 of FIG. 7, the following discussion provides a general description of genetic algorithms.

There are many instances when a system depends on certain parameter values that are unknown before hand. The typical solution to this problem is to guess at reasonable values of the parameters and see what happens. After some time, the data is evaluated and another educated guess is made. Unfortunately, it is often difficult to evaluate what constitutes effective parameter values. Often, the complexity of the system makes the manual evaluation of parameters impractical if not impossible. What is needed is an automated method to adjust parameter values which will yield optimal, or near optimal results with a minimum of input data. This method must operate in an environment where fitness functions, i.e., means of evaluating the effectiveness of parameter values, are not well defined, are not stationary, and contain stochastic elements.

The routine 700 of FIG. 7 illustrates this type of environment. At block 720, the recommendation engine seeks to present users with recommended items, such as songs, albums, artists, stations, books, and news based on knowledge the recommendation engine has about a given user. In one embodiment, the recommendation process is driven by perceptual metrics, which attempt to assign a numerical value to perceptual differences between songs, albums, artists, stations, etc. The metrics, in turn, depend on parameters that represent the mapping from perceptual to parameter space. This mapping generally varies between individuals and even varies for a given individual over time. It is not reasonable to expect a fixed set of parameters that will adequately specify the perceptual metrics for a population of users. Instead, an adaptive system capable of self adjusting the parameter values is needed.

The routine 700 provides a dynamic system with the means to calculate system parameters that adapt to changes in the system input space in a timely fashion. The parameter values will represent near optimal values for the system in question. In the case of a system with a defined and static fitness function, the solution will provide the system with optimal parameters if given sufficient time to calculate those parameters. The solution must be flexible enough to address the needs of several different problem domains, but simple enough to be quickly understood, implemented, and deployed.

In one embodiment, the blocks 750 and 760 are implemented through a Genetic algorithm that works by evolving the fitness of a population of solutions towards ever higher fitness. Think of the population as a group of parameters sets used by the system in question. Each parameter set represents one possible solution to the problem at hand. Over time, the more fit solutions are given more chances to breed than are the less fit solutions. The breeding process combines elements of the effective solutions to form new parameter sets. In one embodiment, (which may or may not be implemented in block 760), mutations in the parameter sets allow novel solutions to enter the population, thus allowing the consideration of solutions that were not initially conceived of prior to the training of the system.

In order for the population to evolve in a useful direction, the system that is dependent on the population must define what it means for an individual parameter set (hereafter referred to as an individual) to be fit. The fitness value of an individual may not be so important. Rather, the relative fitness values between individuals in a population may be more important. For the recommendation engine, in one embodiment the fitness of a given individual is determined by the percentage of recommendations rated as positive from a given individual parameter set. The user rating process provides the necessary feedback to the genetic algorithm to determine fitness.

The first task to tackle when using the genetic algorithm is to specify the format of solutions. Each solution is typically represented by a genome. A genome is a collection of genes. Each gene represents some piece of information about the solution. In one embodiment, the only type of gene supported is the floating point gene. This gene is a convenient format for solutions that are expressed as a set of floating point numbers. In another embodiment, binary genes may be implemented.

In one example implementation, once the solution format, the genome structure, is established, the initial seed population may be created. In this particular example, this seed population may be provided by the user. (In another embodiment, a utility to generate initial populations is used.) The seed population represents the user's a priori information about the problem space. If the user is completely ignorant about the solution space, then an initially random seed population can be used.

The size of the population will depend on the complexity of the problem being solved. The richer the parameter set, the more individuals the user will need in the initial population to sample a reasonable segment of the parameter space. In one embodiment, the recommendation engine maintains a population of about 50 individuals (at times there might be a few less than 50 individuals, however, in this particular example there are generally not more than 50 individuals).

Once the seed population is in place, the population is evolved through a series of epochs. Each epoch contains four key stages: fitness evaluation, death, breeding, mutation, and work. These stages are described in detail below.

The fitness of every individual in the seed population is evaluated using a specified fitness function. The purpose of the fitness function is to form a basis for two decisions made by the genetic algorithm: Will the individual breed? Will the individual survive? The fitness function is the genetic algorithm's main connection to the problem being solved. The fitness function used in the recommendation engine is described in the next section.

After the fitness evaluation, it is time for a Death function to prune the unsuitable individuals from the population. The probability of an individual surviving from one epoch to the next is given by $$P_{survive}(A)=e^{-\delta(MAX\_FITNESS-f_a)} \qquad \text{(Eq. 4)}$$

where δ is the survival rate and f is the fitness of the respective individual. (It will be appreciated that EQUATIONS 4 and 5 of this section are somewhat similar to EQUATIONS 2 and 3 that were described previously with respect to FIG. 7.).

For those who survive the Death function, the breeding session begins. The probability of two individuals breeding is determined by two factors. The first is the fitness values of the two individuals. The fitness value represents the environmental bias the system has for an individual finding a mate. For example, in an organic example, the food supply, population densities, health of the individual, etc., all effect the ability of an individual to find a suitable mate. The probability that individuals A and B find each other and mate is given by the joint probability $$P_{breed}(A,B)=e^{-\alpha(2\ MAX\_FITNESS-f_a-f_b)} \qquad \text{(Eq. 5)}$$

where a is the breeding rate and f is the fitness of the respective individual.

The second factor is the individual bias an individual holds for a particular mate. In a human example, such factors as appearance, wealth, personality, etc., might affect an individual's bias towards an individual. In the genetic algorithm, the personal bias can be used for more practical tasks. For instance, in one embodiment individuals could be modified to favor those individuals that are similar to them, but not too similar, when mating. Such behavior is observed in many animal populations and acts to concentrate traits in particular populations. In the genetic algorithm, this effect could be exploited to encourage population clustering. In one embodiment, the personal bias, while it can be implemented in a Genetic Algorithm, is ignored by an individual object. Instead, in such an embodiment the individual would assume that if a proposed mate is fit enough to find him/her/it, he/she/it is good enough.

Once the mating partners are selected, their genes are combined to form a new individual. The gene combining algorithm, or splicing, is performed by selecting a random point along the genome of an individual and replacing all genes after that point with the genes of the individual's mate.

In one embodiment, a newly minted genome has some probability of undergoing some form of mutation. The probability that a gene is mutated as well as the standard deviation of the mutation probability distribution function is specified by the user. Mutations allow a population to explore new segments of a solution space. Without mutations, a population's characteristics would eventually freeze. However, mutations can destroy quality solutions. Therefore, the mutation rate and depth should be chosen carefully. In one example, typical mutation rates are between 1 and 110 mutations per 1000 genes evaluated. The mutation depth for a binary gene is in some cases considered to be irrelevant; if the gene mutates, it becomes its complement. For floating point genes, in one example the mutation depth could be on the order of a few percent. In other words, the value of the floating point number changes by a few percent.

Finally, the population is available for work. At this point the system retrieves the population and uses the information encoded in the genomes of the individuals to accomplish some task. In the case of the recommendation engine, the task is generating recommendations for various media items, such as illustrated at block 720 of FIG. 7. Following the work stage, a new epoch is entered and the process is repeated. Thus, the routine 700, and the use of the Genetic Algorithm at blocks 750 and 760, allows the recommendation engine to produce parameter sets which evolve over time based on user behavior.

It will be appreciated that the embodiment of the present invention provides a system for generating recommendations which automatically optimizes over time. While known attribute-based recommendation systems used intrinsic properties of items to supply recommendations, the present system adjusts its internal parameters in response to the measured performance of the recommendations as determined by user behavior. The use of feedback from the user in the form of ratings for the recommendations allows the system to adjust the internal parameters towards optimal values over time.

While the preferred embodiment of the invention has been illustrated and described, it will be appreciated that various changes can be made therein without departing from the spirit and scope of the invention.

What is claimed is:

1. In a computer system, a method for providing recommendations of items to a user, the method comprising:
evaluating the items in accordance with sets of parameters;
recommending selected items to a user based on the evaluation of the items;
receiving from the user feedback regarding the recommendations;
adjusting the sets of parameters based on the feedback, wherein a genetic algorithm is utilized for adjusting the sets of parameters, and a fitness evaluation stage is utilized during which the fitness of each parameter set is evaluated and the results of the fitness evaluation are further utilized in a survival stage which determines the survival of each of the parameter sets.

2. The method of claim 1, wherein the feedback from the user is in the form of user ratings of the recommendations.

3. The method of claim 1, wherein the evaluation of the items includes determining affinity values for the items.

4. The method of claim 1, wherein other items that have been selected by the user as favorites are utilized as references for the evaluation of the items.

5. The method of claim 1, wherein the results of the fitness evaluation are further utilized in a mating stage which determines the mating of the parameter sets.

6. The method of claim 5, wherein when two parameter sets mate, a resulting parameter set contains elements from each of the original parameter sets.

7. The method of claim 1, wherein the number of surviving parameter sets is generally limited to 50 or fewer parameter sets.

8. The method of claim 1, wherein an initial population of parameter sets is created using known values.

9. The method of claim 1, wherein an initial population of parameter sets is created through a random process.

10. The method of claim 1, wherein a mutation stage is utilized during which mutated parameter sets are created.

11. In a computer system, a method for providing recommendations of items to a user, the method comprising:
evaluating the items in accordance with sets of parameters;
recommending selected items to a user based on the evaluation of the items;
receiving from the user feedback regarding the recommendations;
adjusting the sets of parameters based on the feedback, wherein a genetic algorithm is utilized for adjusting the sets of parameters and floating point genes are utilized by the genetic algorithm.

12. The method of claim 11, wherein the feedback from the user is in the form of user ratings of the recommendations.

13. The method of claim 11, wherein the evaluation of the items includes determining affinity values for the items.

14. The method of claim 11, wherein other items that have been selected by the user as favorites are utilized as references for the evaluation of the items.

15. The method of claim 11, wherein a fitness evaluation stage is utilized during which the fitness of each parameter set is evaluated.

16. The method of claim 15, wherein the results of the fitness evaluation are further utilized in a mating stage which determines the mating of the parameter sets.

17. The method of claim 16, wherein when two parameter sets mate, a resulting parameter set contains elements from each of the original parameter sets.

18. The method of claim 11, wherein a mutation stage is utilized during which mutated parameter sets are created.

19. In a computer system, a method for providing recommendations of items to a user, the method comprising:
evaluating the items in accordance with sets of parameters;
recommending selected items to a user based on the evaluation of the items;
receiving from the user feedback regarding the recommendations;
adjusting the sets of parameters based on the feedback, wherein a genetic algorithm is utilized for adjusting the sets of parameters and binary genes are utilized by the genetic algorithm.

20. The method of claim 19, wherein the feedback from the user is in the form of user ratings of the recommendations.

21. The method of claim 19, wherein the evaluation of the items includes determining affinity values for the items.

22. The method of claim 19, wherein other items that have been selected by the user as favorites are utilized as references for the evaluation of the items.

23. The method of claim 19, wherein a fitness evaluation stage is utilized during which the fitness of each parameter set is evaluated.

24. The method of claim 23, wherein the results of the fitness evaluation are further utilized in a mating stage which determines the mating of the parameter sets.

25. The method of claim 24, wherein when two parameter sets mate, a resulting parameter set contains elements from each of the original parameter sets.

26. The method of claim 19, wherein a mutation stage is utilized during which mutated parameter sets are created.

27. A system for providing recommendations to a user, the system comprising:
an affinity predictor for receiving information regarding items and determining affinity values for the items, the affinity values being determined according to sets of parameters, the affinity values being used to provide recommendations to the user;
a parameter controller for adjusting the sets of parameters in accordance with feedback from the user regarding the recommendations, wherein the parameter controller utilizes a genetic algorithm; and
an executing component for executing parameter sets that are determined to be undesirable.

28. The system of claim 27, further comprising a mating component for determining the mating of parameter sets.

29. The system of claim 27, further comprising a performance monitor which harvests recommendation performance information from the user.

30. The system of claim 27, further comprising a recommendation factory which selects items that have the highest expected affinity levels as determined by the affinity predictor.

31. The system of claim 30, further comprising a recommendation table which the recommendation factory writes the recommendations to, the recommendations being loaded for the user from the recommendation table.

32. The system of claim 27, further comprising a mutating component for creating mutated parameter sets.

* * * * *

UNITED STATES PATENT AND TRADEMARK OFFICE
CERTIFICATE OF CORRECTION

| | | |
|---|---|---|
| PATENT NO. | : 7,013,238 B1 | Page 1 of 1 |
| APPLICATION NO. | : 10/621268 | |
| DATED | : March 14, 2006 | |
| INVENTOR(S) | : Weare | |

It is certified that error appears in the above-identified patent and that said Letters Patent is hereby corrected as shown below:

On the title page, item (56), under "Other Publications", in column 2, line 1, delete "H.-C.," and insert -- H.C., --, therefor.

In column 5, line 4, delete "1110b," and insert -- 110b, --, therefor.

In column 5, line 4, delete "1110d," and insert -- 110d, --, therefor.

In column 9, line 33 (Eq. 3), delete

"$P_{mate}(A,B) = e^{-\alpha(2*MaxFitness-(f(A)+f(B)))}$"

and insert -- $P_{mate}(A,B) = e^{-\alpha(2*MaxFitness-(f(A)+f(B)))}$ --, therefor.

In column 12, line 16, delete "110" and insert -- 10 --, therefor.

In column 12, line 36, delete "attribute–based" and insert -- attribute based --, therefor.

Signed and Sealed this

Thirtieth Day of March, 2010

David J. Kappos
*Director of the United States Patent and Trademark Office*